3,513,160
PROCESS FOR THE PREPARATION OF 9α-BROMO-11β - HYDROXY - 17α,20;20,21-BISALKYLENEDIOXY PREGNANES
Royal E. Bright, Philadelphia, Richard W. Rees, St. Davids, and Herchel Smith, Wayne, Pa., assignors to American Home Products Corporation, New York, N.Y., a corporation of Delaware
No Drawing. Filed Feb. 1, 1968, Ser. No. 702,191
Int. Cl. C07c *173/00*
U.S. Cl. 260—239.55                                    3 Claims

ABSTRACT OF THE DISCLOSURE

Steroids of the 9α-halo-11β-hydroxy-17α,20;20,21-bisalkylenedioxypregnane series are provided by treating, in acid medium, the corresponding 17α,20;20,21-bisalkylenedioxypregna-9(11)-ene with an N-bromo acid, retaining the bisdioxy group. The products of the process are adrenocortically active, especially as anti-inflammatory agents, or are convertible to other valuable adrenocortically active steroids by cleavage of the bisalkylenedioxy functional group.

---

This invention relates to a process for the preparation of steroid compounds. More particularly, it is concerned with a new and surprisingly useful means to transform a 9(11)-double bond or a 9β,11β-epoxido grouping in a 17α,20;20,21-bisalkylene dioxy pregnane into a 9α-halo-11β-hydroxy function without cleaving the protective (and therapeutically useful) bisalkylene dioxy grouping.

BACKGROUND OF THE INVENTION

Adrenocortically active steroids now constitute a well-defined class in the art, and include therapeutically active agents having a wide range of applications in the medical field. Especially active as systemic and topical anti-inflammatory agents, in comparison with, for example, hydrocortisone and prednisolone, are 9α-halo pregnane analogs related thereto, such as 9α-fluorohydrocortisone, 9α-chlorohydrocortisone, 9α-bromohydrocortisone, 9α-fluoroprednisolone, 9α-fluoro- 16-methylprednisolone, 9α-fluoro-6-methylprednisolone, and the like. While it has been well known for some time that 3,11-bisoxygenated 17α,20;20,-21-bismethylenedioxy ring A unsaturated steroids of the pregnane series have cortisone-like activity and can be used in the treatment of diseases which respond to anti-inflammatory agents, they were deemed to be more useful as intermediates and it has only been recently that their exceptional value in therapy has been fully recognized. Thus, R. E. Beyler and L. H. Sarett in U.S. 2,888,-456 were principally concerned with protecting the dihydroxyacetone side chain at C–17, carrying out reactions at other parts of the steroid nucleus, then regenerating the side chain by treatment of the 17α,20;20,21-bismethylenedioxy compound with acid to obtain a 17α,21-dihydroxy-20-ketosteroid of the pregnane series. On the other hand, it is a matter of common knowledge and experience to prepare 9α-halo-11β-hydroxy steroids of the pregnane series by treating the corresponding Δ$^{9(11)}$-dehydro analog with an N-bromo amide under acidic conditions (with perchloric acid in peroxide-free dioxane), or the corresponding 9β,11β-epoxido analog with the corresponding hydrohalic acids (in the presence of 72% perchloric acid). See, for example, J. Fried and E. Sabo, J. Am. Chem. Soc., 79, 1130 (1957). In view of the above, those skilled in the art would view generally pessimistically any proposal to form a 9α-halo-11β-hydroxy-17α,20,21; 20,21-bisalkylenedioxypregnane by treatment of the corresponding Δ$^{9(11)}$-dehydro analogs or 9β,11β-epoxido analogs under classical (acidic) conditions since the 17α,20; 20,21-bisalkylenedioxy group would be expected to cleave to the dihydroxy-acetone function. However the instant process accomplishes such a truly novel and unexpected result. In particular, the process of this invention provides for the first time the above-mentioned 9α-halo-11β-hydroxy 17α,20;20,21-bisalkylenedioxy pregnanes by an operation on readily available starting materials without cleavage of the desired bialkylenedioxy group.

It is, accordingly, a primary object of this invention to provide a method for introducing a bromine atom into a 17α,20;20,21-bisalkylenedioxy steroid of the pregnane series having a double bond at the 9,11-position of the molecule, whereby said double bond is transformed under acidic conditions and bromine adds at the 9α-position, without concomitant cleavage of the bisalkylenedioxy group.

It is a further primary object of this invention to provide a method for introducing a halogen atom into a 17α,20;20,21-bisalkylenedioxy steroid of the pregnane series having a 9β,11β-epoxido functional group, whereby said epoxido group is transformed under acidic conditions and halogen adds at the 9α-position, without concomitant cleavage of the bisalkylenedioxy group.

Another object of the instant invention is to provide an efficient process for the production of 9α-halo steroids of the 17α,20;20,21-bisalkylenedioxypregnane series wherein a β-hydroxyl or acyloxyl group is adjacent to the aforesaid halogen atom, as these compounds are therapeutically useful per se in view of their anti-inflammatory activity or they can be readily converted to the corresponding 9α-halo-11β-hydroxycorticoids, without the bisalkylenedioxy grouping, which also are of known value.

DESCRIPTION OF THE INVENTION

These and other objects readily apparent to those skilled in the art are achieved with ease through practice of the means of this invention which is, in essence: a process for the preparation of a steroid of the 17α,20;20,21-bisalkylenedioxypregnane series having at the 11-position a β-hydroxy group and at the 9-position an α-halo group, which comprises:

(a) Reacting a 17α,20;20,21-bisalkylenedioxypregna-9 (11)-ene with an N-bromo-amide in an acidic medium to form a 17α,20;20,21-bisalkylenedioxy-9α-bromopregnan-11β-ol; or (b) Reacting a 9β,11β-epoxido-17α,20;20,21-bisalkylenedioxypregnane with a hydrohalic acid to form the corresponding 9α-halo-11β-hydroxy-17α,20;20,21-bisalkylenedioxypregnane.

Special mention is made of several particularly valuable embodiments of this invention. These are, respectively:

A process as above defined wherein 9α-bromo-11β-hydroxy - 17α,20;20,21-bismethylenedioxypregna-1,4-dien-3-one is prepared by reacting 17α,20;20,21-bismethylenedioxypregna-1,4,9(11)trien-3-one with N-bromoacetamide in a medium comprising dioxane acidified with perchloric acid.

A process as first above defined wherein 9α-fluoro-11β-hydroxy - 17α,20;20,21-bismethylenedioxypregna-1,4-dien- 3-one is prepared by reacting 9β,11β-epoxido-17α,20;20,
21-bis-methylenedioxypregna-1,4-dien-3-one with anhydrous hydrogen fluoride.

Among the compounds prepared by the process of this invention are compounds selected from those of general Formula I:

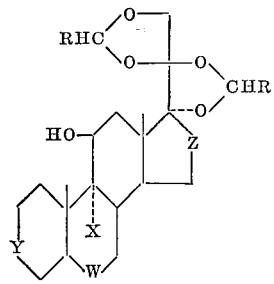

wherein:

R is hydrogen or (lower)alkyl;
W and Z are methylene, (lower)alkylmethylene or (lower)alkoxymethylene;
X is a chloro, bromo, fluoro or iodo; and
Y is keto; the $\Delta^4$- or $\Delta^{1,4}$- dehydro analogs thereof wherein:

Y is keto; the $\Delta^4$-dehydro analogs thereof wherein
Y is methylene; and the 19-nor-$\Delta^{1,3,5(10)}$-dehydro analogs thereof wherein

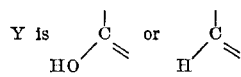

In Formula I, groups W and Z include, generically, hydroxymethylene, and, where appropriate, lower(alkoxy) methylene, and (lower)alkyl methylene with the respective substituents α- and β-oriented. In this specification and in the appended claims, the term "(lower)alkyl" contemplates saturated hydrocarbon radicals, straight and branched chain, having from about 1 to about 6 carbon atoms and includes, for example, methyl, ethyl, n-propyl, i-propyl, n-butyl, n-pentyl, n-hexyl, 3-methylpentyl, and the like. The term "(lower)alkoxy" contemplates saturated hydrocarbonoxy radicals, straight and branched chain, having from about 1 to about 6 carbon atoms and includes, for example, methoxy, ethoxy, n-propoxy, i-propoxy, n-butoxy, t-butoxy, n-pentoxy, n-hexyloxy, 3-methylpentoxy, and the like. The term "N-bromo-amide" contemplates amides (and imides) of a carboxylic acid (including derivatives), for example, N-bromoacetamide (or N-bromoamide of other lower fatty acid), N-bromosuccinimide, dibromodimethylhydantoin, and the like. The term "hydrohalic acid" contemplates and includes hydrobromic acid, hydriodic acid, hydrochloric acid and hydrofluoric acid. The term "pregnane" includes "19-norpregnane (10-desmethylpregnane)" when $\Delta^{1,3,5(10)}$-unsaturation is present in the A-ring of the steroid nucleus.

Starting materials for step (a) of the instant process are 17α,20;20,21 - bisalkylenedioxypregna - 9(11)-enes. Thus, among the compounds useful in step (a) are those of Formula II:

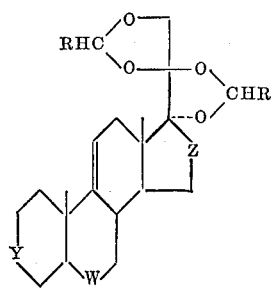

wherein R, W, Y and Z are as above defined, and the $\Delta^4$-, the $\Delta^{1,4}$- and the 19-nor-$\Delta^{1,3,5(10)}$-dehydro analogs thereof as above defined for Formula I.

Compounds of Formula II can be prepared in a number of ways. One such means is to convert a 11α-hydroxy steroid of the pregnane series into a 11α-sulfonic acid ester thereof, especially the 11α-tosylate or 11α-mesylate thereof, converting the latter into the corresponding 9(11) compound, and converting said 9(11) compound into the 17α,20;20,21-bisalkylenedioxy compound of Formula II. The conversion of the 11α-sulfonic acid esters of the steroids into the corresponding 9(11) compounds is best effected by heating the 11α-sulfonic acid ester with an alkali metal salt of a lower fatty acid in a substantially anhydrous liquid lower fatty acid, e.g., (anhydrous) sodium acetate in (glacial) acetic acid, or potassium formate in formic acid. See, for example, J. Fried, U.S. 2,852,511. The conversion of the 9(11)-steroid into the corresponding 17α,20;20,21-bisalkylenedioxy steroid of Formula II is best effected by treating the 9(11)-steroid having the dihydroxyacetone side chain at C-17, with formaldehyde or a lower alkyl aldehyde in an inert organic solvent at a temperature of from about −30° C. to about +50° C.

Starting materials for step (b) of the instant process are 9β,11β - epoxido - 17α,20;20,21-bisalkylenedioxypregnane series. Thus, among the compounds useful in step (b) are those of Formula III:

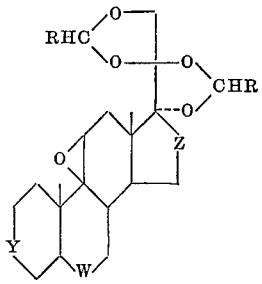

wherein R, W, Y and Z are as above defined, and the $\Delta^4$-, the $\Delta^{1,4}$- and the 19-nor-1,3,5(10)dehydro analogs thereof as above defined for Formula I. Compounds of Formula III can be prepared in a number of ways. One such way is to treat the corresponding $\Delta^{9(11)}$-dehydro steroid of Formula II with hypochlorous acid according to the procedure of S. K. Figdor and G. D. Laubach in U.S. 2,937,975. Another method comprises reacting the $\Delta^{9(11)}$-dehydro compound of Formula II with an N-bromoamide of a carboxylic acid to form the corresponding 9α-bromo-11β-hydroxy compounds, then reacting these with a mild dehydrobrominating reagent, such as potassium bicarbonate, or potassium acetate in a solvent such as methanol or ethanol or mixtures thereof with water, at a temperature of from about 20° C. to about 100° C., for from about 30 minutes to about 18 hours, according to the procedure of J. Fried, U.S. 2,852,511.

In carrying out th instant process, step (a), the 17α, 20;20,21-bisalkylendioxypregna-9(11)-ene compound of Formula II, is reacted with the N-bromoamide (or imide) of a carboxylic acid (or an obvious chemical equivalent thereof), for example, N-bromoacetamide, N-bromosuccinimide or dibromodimethylhydantoin. Preferably this reaction is effected in the presence of perchloric acid or other relatively strong acid; for example, p-toluenesulfonic acid or trichloroacetic acid. The reaction is preferably conducted in a solvent medium, such as in dioxane, preferably acidified with, for example, perchloric acid. The steroid of Formula II is dissolved in the medium and the N-bromoamide is added in small portions until a stoichiometrically-equivalent amount (or small excess) has been added. The reaction is substantially complete after about one half hour, but longer times may enhance the yield, in some cases. The 17α,20;20,21-bisalkylenedioxy-9- bromopregnan-11β-ol can be recovered by any conventional means. One especially convenient technique is to add a slight excess of an aqueous solution of sodium sulfite, then a rather large volume of water. The product can be extracted into a water-immiscible solvent, such as chloroform and, after drying the extract and evaporation of the solvent, the product remains as a residue. It can be recrystallized, if desired, from a solvent, such as chloroform, or a lower alkanol, such as methanol, or from mixtures thereof.

In carrying out the instant process, step (b), the 9β,11β-epoxido-17α,20;20,21-bisalkylenedioxypregnanes of Formula III are very reactive and, unlike the corresponding α-epoxido compounds, they react easily with agents known to split the oxido rings under mild (but acidic) conditions. Thus, the ring can be split by hydrobromic acid to obtain the corresponding 9α-bromo-11β-hydroxy compound; by hydriodic acid to obtain the corresponding 9α-iodo-11β-hydroxy compound; by hydrochloric acid to obtain the corresponding 9α-chloro-11β-hydroxy compound and by hydrofluoric acid to obtain the corresponding 9α-fluoro-11β-hydroxy compound, the reaction being preferably effected in an alcohol-free solvent, such as chloroform, carbon tetrachloride, glacial acetic acid or tetrahydrofuran, and at a temperature of below about 20° C., and preferably below about 0° C., and especially at about −60° C. The reaction is substantially complete in about 10 minutes at 20° C. if hydrobromic acid is used; in about 20 minutes at −20° C. if hydriodic acid is used; in about 60 minutes at 0° C. if hydrogen chloride is used and in about 3.5 hours at about 0° C. if hydrofluoric acid is used. The 9α-halo-11β-hydroxy-17α,20;20,21-bisalkylenedioxypregnane can be recovered by any conventional means. One especially convenient technique is to add a mixture of aqueous potassium carbonate ice and chloroform to the reaction mixture. The chloroform layer is separated, washed, then dried over anhydrous sodium sulfate. Evaporation of the solvent leaves the product as a residue. It can be purified, if desired, by recrystallization from a solvent, such as acetone, ethyl acetate, a lower alkanol, such as methanol, and the like.

As is mentioned hereinabove, steroids of the 17α,20;20,21-bisalkylenedidoxypregnane series having at the 11-position a β-hydroxy group and at the 9-position an α-halo group, especially those of Formula I, prepared by this new process, have been found to possess useful pharmacological properties, especially adrenocorticoidal activity. They are thus useful for treatment of a range of conditions responsive to systemic and topical anti-inflammatory agents, such as arthritis and dermatitis. The products prepared by the instant process are also useful as intermediates for the preparation of other steroids, such as 9α-fluorohydrocortisone, which have been used to treat various allergic and non-allergic dermatoses and in parenteral use, in adrenal insufficiency from any cause (see, Merck Index, seventh edition, p. 457 (1960)).

The products prepared by the process of this invention can be used in association with a pharmaceutically-acceptable carrier. They can be formulated in liquid or solid form, for instance, as capsules, tablets, suppositories, powders, dispersible granules, cachets, and the like, by combining them with conventional carriers. Such conventional carriers include magnesium carbonate or stearate, talc, sugar, lactose, pectin, dextrin, starch, gelatin, tragacanth, methyl cellulose, sodium carboxymethyl cellulose, low melting wax and cocoa butter. Diluents, flavoring agents, solubilizers, lubricants, suspending agents, binders or tablet-disintegrating agents can be used. Powders or tablets preferably contain 5 or 10 to 99% of the active constituent. The active steroid can be formulated with an encapsulating material with or without other carriers. They can be formulated into entirely conventional creams, lotions, ointments and the like, for topical application.

Liquid preparations such as solutions, suspensions or emulsions can also be used. Such preparations include dispersions in a pharmaceutically acceptable carrier such as arachis oil or sterile water, preferably containing a non-ionic surface active agent such as fatty acid esters of polyhydroxy compounds, e.g., sorbitan, aqueous starch in sodium carboxymethylcellulose solutions, aqueous propylene glycol or polyethylene glycol. Thus a water-propylene glycol solution can be used for parenteral injection and aqueous suspension suitable for oral use can be made by utilizing natural or synthetic gums, resins, methyl cellulose or other well known suspending agents.

The compositions can be in unit dose form in which the dose unit is for instance from about 1 to about 200 mg. of each active steroid. The unit dose form can be a packaged composition, e.g., packeted powder, vials or ampules or, for example, in the form of capsules, cachets or tablets or any number of these in packaged form. The pharmaceutical compositions can also consist substantially solely of the active steroid when this is in unit dose form. When used for the purposes stated above, the dosage of the compounds will vary with the condition being treated, but in general can vary from about 0.1 to about 3 mg./kg. of body weight per day depending on the many factors of the case involved.

Of course, as will be clear to those skilled in the art, in addition to compounds designated by Formulae II and III, the process in its broadest aspects can be applied to obvious chemical equivalents thereof but differing therefrom in the sense of having other functional groups attached to the steroid nucleus, whenever such groups do not themselves interfere or become affected by the process. Broadly stated therefore, useful substrates would be represented by the formula

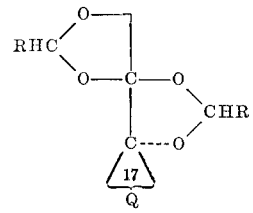

wherein R is hydrogen or (lower)alkyl and Q is a radical of at least enough carbon and hydrogen atom content so as to complete a cyclopentanopolyhydrophenanthrene nucleus containing either: (a) a 9(11)-double bond or (b) a 9β,11β-epoxido linkage, which substrate, on treatment in acidic medium with either, in the case of (a), an N-bromo amide, or, in the case of (b), a hydrohalic acid, would provide an adrenocortically active steroid, or one convertible thereto by cleavage of the bisalkylenedioxy group at the 17-position.

DESCRIPTION OF THE PREFERRED EMBODIMENTS

The following examples are given by way of illustration and are not to be construed as limitations of this invention, variations of which are possible without departing from the scope and spirit thereof.

EXAMPLE 1

9α-bromo-11β-hydroxy-17α,20;20,21-bismethylenedioxypregna-1,4-dien-3-one (a) 17α,20;20,21-bismethylenedioxypregna-1,4,9(11)-trien-3-one.—11β-hydroxy-17α,20;20,21-bismethylenedioxypregna-1,4-dien-3-one [Beyler et al., JACS 26, 2421 (1961)] (11.5 g.) in 360 ml. of dimethylformamide, 29 ml. of pyridine and 18 ml. of methanesulfonyl chloride is heated on a steam bath for 3 hours. The dark solution is cooled and water (approximately 750 ml.) is added. The turbid mixture is extracted with methylene chloride, the organic phase washed twice with HCl (2 N), saturated NaHCO₃ solution, water, and dried over Na₂SO₄. Removal of solvent in vacuo and crystallization from acetone gives the title compound (4 g.) M.P. 197–204° C.;

$\lambda^{KBr}_{max.}$ 3.46, 3.55, 6.03, 6.18, 6.26μ.

(b) 9α-bromo-11β-hydroxy-17α,20;20,21 - dimethylenedioxypregna - 1,4 - dien-3-one.—17α,20;20,21 - bismethylenedioxypregna-1,4-9(11)-trien-3-one (4 g., 10.6 mmoles) is dissolved in 40 ml. of dioxane and 6.2 ml. of 0.5 N HClO₄. To this slightly turbid solution, N-bromoacetamide (91% by thiosulfate titration) (1.87 g., 12.3 mmoles) is added in small portions over a period of 40 minutes, while stirring. After stirring a total of 2 hours at room temperature, a slight excess of a saturated solution of Na₂SO₃ (discharge of yellow color) followed by a large quantity of water are added. The mixture is extracted with CHCl₃, the organic layer washed with saturated NaHCO₃ and saturated brine, dried over CaCl₂ and concentrated in vacuo to give the crude product (3 g.). Recrystallizaton from CHCl₃-MeOH yielded the title product (1.95 g.) M.P., 145° C., with charing, $C_{23}H_{29}BrO_6$ requires: C, 57.38%; H, 6.07%. Found: C, 57.46%; H, 5.96%;

$\lambda^{KBr}_{max.}$ 2.85, 3.00, 3.45, 3.50, 6.03, 6.14, 6.23μ;

$\lambda^{EtOH}_{max.}$ 242 mμ (14,050). NMR: signals at 1.13 (3 proton singlet, C–18 H), 1.72 (3 proton singlet, C–19 H), 4.00 (2 proton quartet, C–21 H), 4.61 (1 proton multiplet, 11α H), 5.0, 5.21 (pair of singlets 6 proton total, BMD H), 5.92–6.34 (2 proton multiplet, C–2 and C–4 H), 7.39 (1 proton doublet, C–1 H) p.p.m.

EXAMPLE 2

The procedure of Example 1(b) is repeated, substituting for N-bromoacetamide, stoichiometrically-equivalent amounts of N-bromosuccinimide and dibromodimethylhydantoin. Substantially the same results are obtained.

EXAMPLE 3

The procedure of Example 1 is repeated, substituting for the 9α-bromo-11β-hydroxy-17α,20;20,21 - bismethylenedioxypregna-1,4-dien-3-one, stoichiometrically - equivalent amounts of the following 17α,20;20,21-bisalkylenedioxypregna-9(11)-enes:

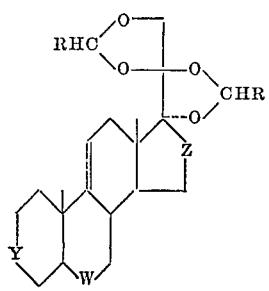

| R | W | Y | Z | Unsaturation |
|---|---|---|---|---|
| CH₃ | CH₂ | C=O | CH₂ | Δ¹,⁴ |
| CH₂(CH₂)₄CH₃ | CH₂ | C=O | CH₂ | Δ¹,⁴ |
| H | CH₂ | C=O | CH₂ | Δ⁴ |
| H | CH₂ | C=O | CH₂ | None |
| H | CH₂ | CH₂ | CH₂ | None |
| H | CH₂ | CH₂ | CH₂ | Δ⁴ |
| H | CH₂ | CH | CH₂ | Δ¹,³,⁵(10) |
| H | CH₂ | CHOH | CH₂ | Δ¹,³,(10) |
| H | CHCH₃ | C=O | CH₂ | Δ¹,⁴ |
| H | CH₂ | C=O | CHCH₃ | Δ¹,⁴ |
| H | CHOCH₃ | C=O | CH₂ | Δ¹,⁴ |
| H | CH₂ | C=O | CHCH₃ | Δ¹,⁴ |

There are obtained the following 17α,20;20,21-bisalkylenedioxy-9α-bromopregnan-11β-ols:

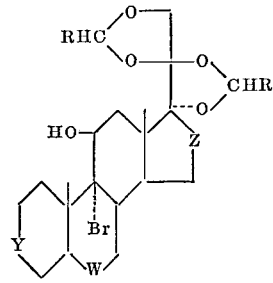

| R | W | Y | Z | Unsaturation |
|---|---|---|---|---|
| CH₃ | CH₂ | C=O | CH₂ | Δ¹,⁴ |
| CH₂(CH₂)₄CH₃ | CH₂ | C=O | CH₂ | Δ¹,⁴ |
| H | CH₂ | C=O | CH₂ | Δ⁴ |
| H | CH₂ | C=O | CH₂ | None |
| H | CH₂ | CH₂ | CH₂ | None |
| H | CH₂ | CH₂ | CH₂ | Δ⁴ |
| H | CH₂ | CH | CH₂ | Δ¹,³,⁵(10) |
| H | CH₂ | CHOH | CH₂ | Δ¹,³,⁵(10) |
| H | CHCH₃ | C=O | CH₂ | Δ¹,⁴ |
| H | CH₂ | C=O | CHCH₃ | Δ¹,⁴ |
| H | CHOCH₃ | C=O | CH₂ | Δ¹,⁴ |
| H | CH₂ | C=O | CHCH₃ | Δ¹,⁴ |

EXAMPLE 4

9α-fluoro-11β-hydroxy-17α,20;20,21-bismethylenedioxypregna-1,4-dien-3-one (a) 9β,11β - epoxy - 17α,20;20,21 - bismethylenedioxypregna-1,4-dien-3-one.—9α-bromo - 11β - hydroxy-17α,20; 20,21-bismethylenedioxypregna-1,4-dien-3-one (1.74 g.) in 100 ml. of ethanol and 2.1 g. of potassium acetate is heated at reflux for 17 hours. The reaction mixture then is allowed to cool and is evaporated under reduced pressure to about 25–50 ml. Distilled water (250 ml.) is then added slowly with vigorous stirring. The crystals are collected by filtration, washed thoroughly with water and dried (1.38 g.) (95.4%). Recrystallization from acetone yields the title compound (730 mg.) M.P., 194–200° C.; 209–214° C. $C_{23}H_{28}O_6$ requires: C, 68.98%; H, 7.05%. Found: C, 69.22%; H, 6.73%.

$\lambda^{KBr}_{max.}$ 3.41, 3.46–3.49, 3.53, 6.02, 6.14, 6.23 μ.

$\lambda^{EtOH}_{max.}$ 248 mμ, ε (log ε)=15,400 (4.188). [α]$_D^{24}$ −74° (1.389% CHCl₃). NMR: signals at 1.04 (3 proton singlet, C–18 H), 1.47 (3 proton singlet, C–19 H), 3.21 (1 proton multiplet, 11αH), 3.97 (2 proton singlet, C–21 H), 5.04, 5.22 (6 proton multiplet, BMD H), 6.03–6.31 (2 proton multiplet, C–2 and C–4 H), 6.65 (1 proton doublet, C–1 H) p.p.m.

(b) 9α-fluoro - 11β - hydroxy-17α,20:20,21-bismethylenedioxy-pregna-1,4-dien - 3 - one.—9β,11β-epoxy-17α,20; 20,21-bismethylenedioxypregna-1,4-dien-3-one (0.63 g.) in 6 ml. of CHCl₃ is chilled to −60° C.; then added to a mixture of 1.0 ml. of anhydrous HF, 1.03 ml. of tetrahydrofuran and 0.79 ml. of CHCl₃, stirred well and chilled to −60° C. After the addition is complete the mixture is allowed to stand in an ice bath for 3.5 hours. After rechilling to −60° C. the reaction is stopped by pouring into a well stirred mixture of aqueous K₂CO₃, ice, and CHCl₃. The layers are separated and the aqueous phase washed with several additional portions of CHCl₃. The combined CHCl₃ layers are then washed with 2 N HCl, saturated bicarbonate solution, saturated NaCl solution, and dried over Na₂SO₄. The oil obtained by removal of solvent in vacuo is crystallized to give the title product (200 mg.) M.P. 294–310° C. (decomp.);

$\lambda_{max.}^{EtOH}$ 239 mμ ε (log ε)=16,500 (4.22);

$\lambda_{max.}^{KBr}$ 2.95, 3.44, 3.52, 6.02, 6.15, 6.23 μ. NMR: signals at 1.10 (3 proton singlet, C–18 H), 1.54 (3 proton singlet, C–19 H), 3.97 (2 proton quartet, C–21 H), 4.18 (1 proton multiplet, 11αH), 4.94, 5.17 (6 proton multiplet, BMD H) 5.93–6.34 (2 proton multiplet C–2, C–4 H), 7.30 (1 proton doublet, C–1 H) p.p.m.

EXAMPLE 5

9α-bromo-11β-hydroxy-17α,20;20,21-bis-methylenedioxy-pregna-1,4-dien-3-one

To a solution of 25 mg. of 9β,11β-epoxy -17α,20;20,21-bis-methylenedioxypregna-1,4-dien-3-one in 0.5 ml. of glacial acetic acid and 0.5 ml. of carbon tetrachloride is added at room temperature 0.04 ml. of 30% hydrobromic acid in glacial acetic acid. After 10 minutes, 10 ml. of chloroform is added, and the mixture is extracted with dilute sodium bicarbonate and with water. The chloroform solution is dried over sodium sulfate, evaporated to dryness in vacuo and the residue is recrystallized from acetone to afford the product.

EXAMPLE 6

9α-iodo-11β-hydroxy-17α,20;20,21-bis-methylenedioxy-pregna-1,4-dien-3-one

A solution of 200 mg. of 9β,11β-epoxy-17α,20;20,21-bismethylenedioxypregna-1,4-dien-3-one in 20 ml. of chloroform is cooled to −20° C. in an ice-salt bath and 0.4 ml. of freshly distilled 55% aqueous hydriodic acid is added. The mixture is agitated thoroughly for 20 minutes, after which water is added and the layers are separated. The chloroform solution is washed with dilute sodium bicarbonate, dilute sodium sulfite and water, and finally dried over sodium sulfate. Evaporation of the solvent in vacuo leaves the product as a residue, which is recrystallized from ethyl acetate.

EXAMPLE 7

9α-chloro-11β-hydroxy-17α,20;20,21-bismethylene-dioxypregna-1,4-dien-3-one

To a solution of 100 mg. of 9β,11β-epoxy-17α,20;20,21-bismethylenedioxypregna-1,4-dien-3-one in 10 ml. of alcohol-free chloroform is added, at 22° C., 1.5 ml. of 3 N hydrochloric acid in chloroform. After 60 minutes, ice and dilute potassium bicarbonate are added to wash out excess acid; and after separation of the layers, the chloroform solution is washed with water, dried over sodium sulfate and evaporated to dryness. The crystalline residue is recrystallized from acetone to provide the product.

EXAMPLE 8

The procedure of Examples 4–7 are repeated, substituting for the 9β,11β-epoxy-17α,20;20,21-bismethylene-dioxypregna-1,4-dien-3-one, stoichiometrically-equivalent amounts of the following 9β,11β-epoxy-17α,20;20,21-bis-alkylenedioxypregnanes:

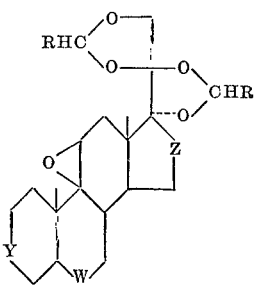

| R | W | Y | Z | Unsaturation |
|---|---|---|---|---|
| CH₃ | CH₂ | C=O | CH₂ | Δ¹,⁴ |
| CH₂(CH₂)₄CH₃ | CH₂ | C=O | CH₂ | Δ¹,⁴ |
| H | CH₂ | C=O | CH₂ | Δ⁴ |
| H | CH₂ | C=O | CH₂ | None |
| H | CH₂ | CH₂ | CH₂ | None |
| H | CH₂ | CH₂ | CH₂ | Δ⁴ |
| H | CH₂ | CH | CH₂ | Δ¹,³,⁵⁽¹⁰⁾ |
| H | CH₂ | CHOH | CH₂ | Δ¹,³,⁵⁽¹⁰⁾ |
| H | CHCH₃ | C=O | CH₂ | Δ¹,⁴ |
| H | CH₂ | C=O | CHCH₃ | Δ¹,⁴ |
| H | CHOCH₃ | C=O | CH₂ | Δ¹,⁴ |
| H | CH₂ | C=O | CHOCH₃ | Δ¹,⁴ |

There are obtained, respectively, the corresponding 17α,20;20,21-bisalkylenedioxy-9α-halopregnan-11β-ols of the formula:

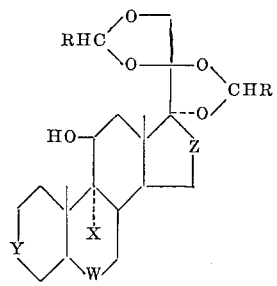

| R | W | X | Y | Z | Unsaturation |
|---|---|---|---|---|---|
| CH₃ | CH₂ | F | C=O | CH₂ | Δ¹,⁴ |
| CH₂(CH₂)₄CH₃ | CH₂ | F | C=O | CH₂ | Δ¹,⁴ |
| H | CH₂ | F | C=O | CH₂ | Δ⁴ |
| H | CH₂ | F | C=O | CH₂ | None |
| H | CH₂ | F | CH₂ | CH₂ | None |
| H | CH₂ | F | CH₂ | CH₂ | Δ⁴ |
| H | CH₂ | F | CH | CH₂ | Δ¹,³,⁵⁽¹⁰⁾ |
| H | CH₂ | F | CHOH | CH₂ | Δ¹,³,⁵⁽¹⁰⁾ |
| H | CHCH₃ | F | C=O | CH₂ | Δ¹,⁴ |
| H | CH₂ | F | C=O | CHCH₃ | Δ¹,⁴ |
| H | CHOCH₃ | F | C=O | CH₂ | Δ¹,⁴ |
| H | CH₂ | F | C=O | CHCH₃ | Δ¹,⁴ |
| CH₃ | CH₂ | Br | C=O | CH₂ | Δ¹,⁴ |
| CH₂(CH₂)₄CH₃ | CH₂ | Br | C=O | CH₂ | Δ¹,⁴ |
| H | CH₂ | Br | C=O | CH₂ | Δ⁴ |
| H | CH₂ | Br | C=O | CH₂ | None |
| H | CH₂ | Br | CH₂ | CH₂ | None |
| H | CH₂ | Br | CH₂ | CH₂ | Δ⁴ |
| H | CH₂ | Br | CH | CH₂ | Δ¹,³,⁵⁽¹⁰⁾ |
| H | CH₂ | Br | CHOH | CH₂ | Δ¹,³,⁵⁽¹⁰⁾ |
| H | CHCH₃ | Br | C=O | CH₂ | Δ¹,⁴ |
| H | CH₂ | Br | C=O | CHCH₃ | Δ¹,⁴ |
| H | CHOCH₃ | Br | C=O | CH₂ | Δ¹,⁴ |
| H | CH₂ | Br | C=O | CHCH₃ | Δ¹,⁴ |
| CH₃ | CH₂ | I | C=O | CH₂ | Δ¹,⁴ |
| CH₂(CH₂)₄CH₃ | CH₂ | I | C=O | CH₂ | Δ¹,⁴ |
| H | CH₂ | I | C=O | CH₂ | Δ⁴ |
| H | CH₂ | I | C=O | CH₂ | None |
| H | CH₂ | I | CH₂ | CH₂ | None |
| H | CH₂ | I | CH₂ | CH₂ | Δ⁴ |
| H | CH₂ | I | CH | CH₂ | Δ¹,³,⁵⁽¹⁰⁾ |
| H | CH₂ | I | CHOH | CH₂ | Δ¹,³,⁵⁽¹⁰⁾ |
| H | CHCH₃ | I | C=O | CH₂ | Δ¹,⁴ |
| H | CH₂ | I | C=O | CHCH₃ | Δ¹,⁴ |
| H | CHOCH₃ | I | C=O | CH₂ | Δ¹,⁴ |
| H | CH₂ | I | C=O | CHOCH₃ | Δ¹,⁴ |
| CH₃ | CH₂ | Cl | C=O | CH₂ | Δ¹,⁴ |
| CH₂(CH₂)₄CH₃ | CH₂ | Cl | C=O | CH₂ | Δ¹,⁴ |
| H | CH₂ | Cl | C=O | CH₂ | Δ⁴ |
| H | CH₂ | Cl | C=O | CH₂ | None |
| H | CH₂ | Cl | CH₂ | CH₂ | None |
| H | CH₂ | Cl | CH₂ | CH₂ | Δ⁴ |
| H | CH₂ | I | CH | CH₂ | Δ¹,³,⁵⁽¹⁰⁾ |
| H | CH₂ | Cl | CHOH | CH₂ | Δ¹,³,⁵⁽¹⁰⁾ |
| H | CHCH₃ | Cl | C=O | CH₂ | Δ¹,⁴ |
| H | CH₂ | Cl | C=O | CHCH₃ | Δ¹,⁴ |
| H | CHOCH₃ | Cl | C=O | CH₂ | Δ¹,⁴ |
| H | CH₂ | Cl | C=O | CHOCH₃ | Δ¹,⁴ |

What is claimed is:

1. A process for the preparation of a steroid of the 17α,20;20,21 - bisalkylenedioxypregnane series having at the 11-position a β-hydroxy group and at the 9-position an α-bromo group, which comprises reacting a 17α,20;20,21-bisalkylenedioxypregna-9(11)-ene with a N-bromo-amide in an acidic medium to form a 17α,20;20,21 - bisalkylenedioxy-9α-bromo-pregnan-11β-ol or 2. A process as defined in claim 1 wherein the 17α,20;20,21-bisalkylenedioxypregnane product is selected from the group consisting of a compound of the formula:

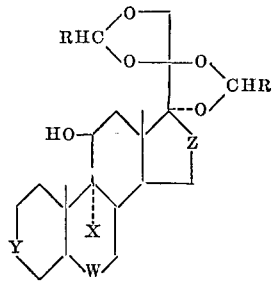

wherein
R is hydrogen or (lower)alkyl;
W and Z are methylene, (lower)alkylmethylene or (lower)alkoxymethylene;
X is bromo; and
Y is keto; the Δ⁴- or Δ¹,⁴-dehydro analogs thereof wherein
Y is keto; the Δ⁴-dehydro analogs thereof wherein
Y is methylene; and the 19-nor-Δ¹,³,⁵(¹⁰)-dehydro analogs thereof wherein

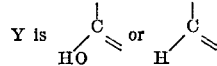

3. A process as defined in claim 1 wherein 9α-bromo-11β-hydroxy-17α,20;20,21-bismethylenedioxypregna-1,4-dien-3-one is prepared by reacting 17α,20;20,21-bismethylenedioxypregna-1,4,9(11)trien - 3 - one with N-bromo acetamide in a medium comprising dioxane acidified with perchloric acid.

No references cited.

HENRY A. FRENCH, Primary Examiner

U.S. Cl. X.R.
260—397.45, 999